United States Patent [19]

Merrell

[11] 3,764,916

[45] Oct. 9, 1973

[54] TOUCH ACTUATED TRANSISTORIZED AFC DEFEAT CIRCUIT

[75] Inventor: Richard G. Merrell, Darien, Ill.

[73] Assignee: Zenith Radio Corporation, Chicago, Ill.

[22] Filed: Dec. 22, 1971

[21] Appl. No.: 210,996

[52] U.S. Cl. ............ 325/418, 178/5.8 AF, 325/423

[51] Int. Cl. ............ H04b 1/16

[58] Field of Search ............ 325/418–423, 335, 346, 453, 457, 468, 416, 417; 178/5.8 AF, 7.3 R; 200/52, DIG. 2; 317/146, DIG. 2; 340/258

[56] References Cited

UNITED STATES PATENTS

| | | | |
|---|---|---|---|
| 2,560,313 | 7/1951 | Tellier | 325/417 |
| 2,560,312 | 7/1951 | Tellier | 325/417 |

*Primary Examiner*—Albert J. Mayer
*Attorney*—Nicholas A. Camasto et al.

[57] ABSTRACT

An AFC defeat circuit in a television receiver for disabling the receiver's automatic frequency control (AFC) system during manual fine-tuning of the input tuner stage. The circuitry utilizes the potential developed across a storage capacitor in the output circuit of a "normally OFF" transistor to provide a d-c voltage to the high-potential end of a voltage divider biasing network in the AFC system. There is further provided a conventional, fine-tuning control knob coated with an electron-conductive material to derive an input signal during manual fine-tuning from low-frequency radiation picked up by the user's body. The input signal, approximating a sine wave, alternately switches the transistor between non-conductive (OFF) and conductive (ON) states, charging and discharging the storage capacitor, respectively. When the transistor is OFF, the capacitor is charged through a high impedance; but when the transistor is ON, the capacitor discharges through the low impedance of the transistor. Due to the difference in RC time constants between the charge and discharge cycles, the collector output will be very nearly ground whenever the fine-tuning knob is actuated. Accordingly, when the fine-tuning knob is touched, the voltage divider bias is reduced to ground potential disabling the AFC system.

3 Claims, 1 Drawing Figure

PATENTED OCT 9 1973 3,764,916
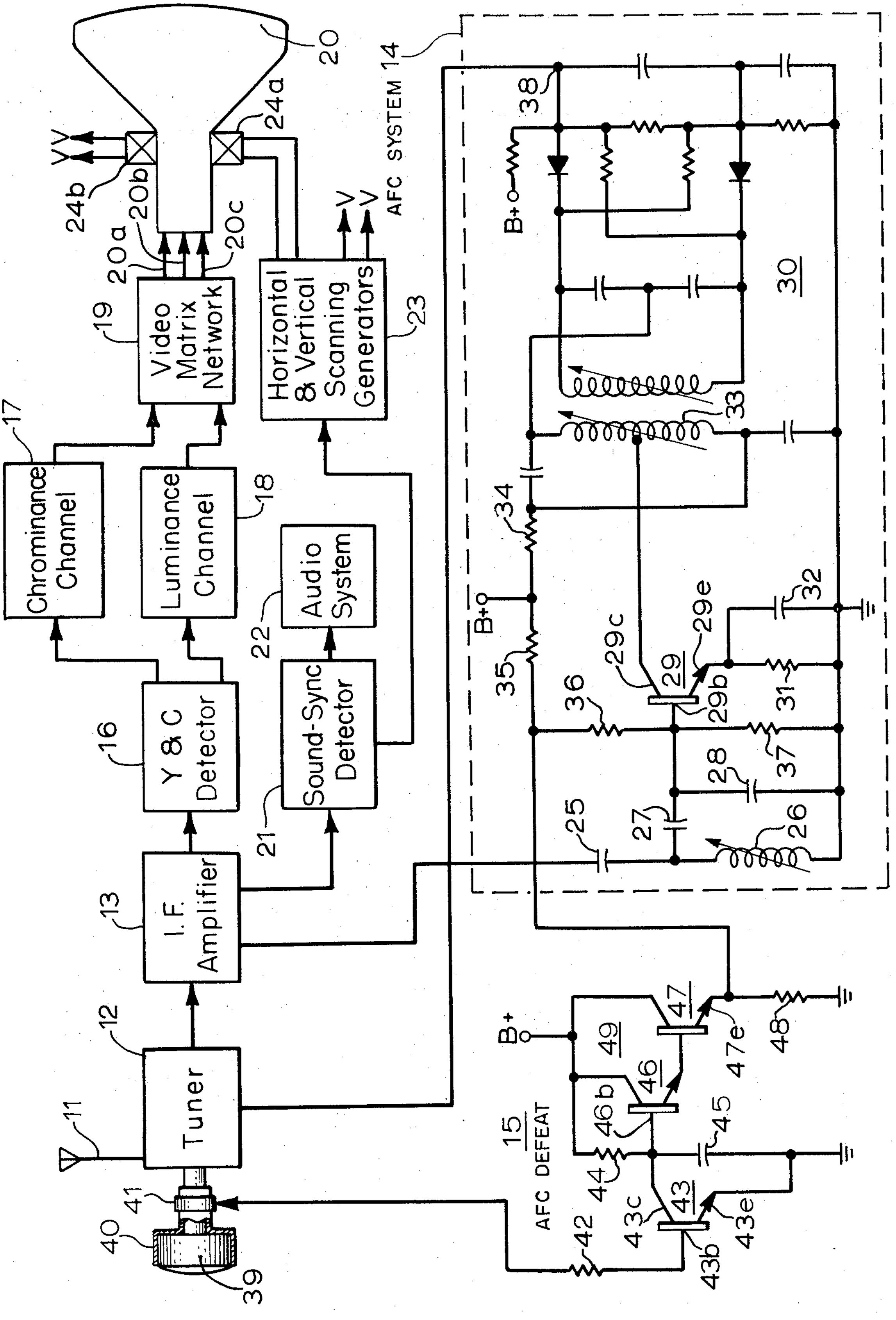

TOUCH ACTUATED TRANSISTORIZED AFC DEFEAT CIRCUIT

BACKGROUND OF THE INVENTION

The present invention relates generally to improvements in television receivers and more particularly to an AFC defeat circuit for insuring that the AFC system is inoperative during manual fine-tuning.

The general concept of Automatic Frequency Control (AFC) for television receivers is known in the art and has been adapted to radio receivers as well as to television receivers of both the monochrome and color variety. The general purpose of such a system is to assist the user in attaining proper fine-tuning of the receiver without requiring critical manual adjustment. The advantage of such a system is self-evident but its value to a color receiver is markedly increased due to the fact that improper tuning of a color receiver manifests itself in incorrect colors, or even a total lack of color, in the reproduced image. Typically, the AFC system is tuned to a reference or center frequency corresponding to the desired video IF frequency and so long as the tuning is reasonably close, within the response of the AFC system, an error voltage is developed to correct the tuning. If the user of the television receiver makes the fine-tuning adjustment while the AFC system is operative, he may adjust it to a point where the picture is acceptable but a substantial amount of AFC correction voltage is required. Thus, the receiver may be tuned at the limit of the "hold-in" range and would not give the proper "pull-in" performance when the channel selector is switched to the next channel. Accordingly, it is desirable to include an AFC defeat circuit for disabling the AFC system during manual fine-tuning. Heretofore, most AFC defeat circuits have required that the user of the television receiver defeat the AFC system by means of a manual switch. It is apparent, however, that the typical user of a television receiver may at times forget to flip the switch and hence the attendant problems are realized.

SUMMARY OF THE INVENTION

Accordingly, it is an object of the present invention to provide new and improved circuitry for disabling the AFC system in a television receiver which overcomes the disadvantages and deficiencies of prior means.

A further object of the invention is to provide an AFC defeat circuit for disabling the AFC system only during manual fine-tuning of the input tuner stage thereby facilitating proper fine-tuning of the television receiver.

A more particular object of the invention is to provide an AFC defeat circuit which eliminates the manually operated switches heretofore necessary to disable the AFC system.

Another object of the invention is to provide an electronic AFC defeat circuit.

In accordance with the present invention, an AFC defeat circuit is provided for automatically disabling the AFC system in a television receiver whenever the receiver is fine-tuned. In a preferred embodiment, the AFC defeat circuit includes a conventional, fine-tuning control knob for manually fine-tuning the input tuner stage. The knob is coated with an electron-conductive material having electrical continuity to the base electrode of an associated switching transistor. The conductive coating serves to transmit input signals, derived from radiation picked up by the user's body through his fingers, to the transistor base electrode. When the fine-tuning knob is not actuated the transistor is correspondingly OFF due to a lack of input signal at the base electrode. A capacitor connected between the transistor collector electrode and ground is charged to a predetermined d-c potential through a high-impedance resistive element connected between the collector electrode and a source of unidirectional potential (B+). Upon manual actuation of the fine-tuning knob, input signals approximating a sine wave alternately switch the transistor between non-conductive and conductive states such that the capacitor correspondingly charges through the resistive element and discharges through the low impedance of the transistor. The smaller RC time constant of the discharge path assures that almost immediately upon actuation of the manual fine-tuning knob the charge stored in the capacitor will be discharged to ground. The collector electrode is, in turn, coupled to the high potential end of a voltage divider, biasing network in the AFC system. Thus, whenever the manual fine-tuning knob is touched, the bias across the voltage divider is removed, and the AFC system is disabled.

BRIEF DESCRIPTION OF THE DRAWING

The features of this invention which are believed to be novel are set forth with particularity in the appended claims. The invention together with its further objects and advantages thereof, may be best understood, however, by reference to the following description taken in conjunction with the accompanying drawing of a television receiver illustrating a preferred embodiment of the present invention.

PREFERRED EMBODIMENT OF THE INVENTION

Referring now to the drawing, a color television receiver is shown which includes an AFC defeat circuit in accordance with the present invention. The receiver includes an antenna 11 coupled to an input tuner stage 12 which may include a tunable RF amplifier, variable frequency heterodyne oscillator and mixer. The tuner stage 12 functions to select a particular broadcast channel and convert the received RF signal to an intermediate frequency having video and audio components of desired respective values. The amplified and converted signal is coupled to an intermediate-frequency (IF) amplifier 13 where it is further amplified and coupled to a luminance (Y) and chrominance (C) detector 16, and also to a sound-sync detector 21. An AFC system, identified generally by dashed-line block at 14 and having an input coupled to IF amplifier 13 and an output coupled to the input tuner stage 12, insures that the receiver is properly fine-tuned without requiring critical manual adjustment. An AFC defeat circuit, identified generally at 15, is coupled to AFC system 14, however, to permit manual fine-tuning when so desired.

The Y & C detector 16 is connected to a chrominance channel 17 for developing the chrominance signals, which are applied to a video matrix network 19 as one of the informational inputs thereto. Detector 16 is likewise connected to the luminance channel 18 wherein the luminance signals are processed prior to application to the video matrix network 19, forming the other of its informational inputs. Appropriate matrixing occurs within matrix network 19 such that signals containing the correct brightness, hue and color saturation information are derived and applied to the appropriate control electrodes of the image reproducer 20 in a manner understood in the art. The image reproducer 20 may be a conventional shadow mask cathode-ray tube comprising a tricolor image screen or target (not shown) to be selectively scanned by a group of three electron beams developed by individual guns within the tube. In the embodiment of the receiver as herein shown, the color signals R, G and B are applied directly to the cathodes 20*a*, 20*b* and 20*c*, respectively. It should be understood, however, that other systems are equally compatible, such as those receivers designed to utilized color-difference signals. The type of chroma processing is not directly related to the subject matter of the present invention and is in no way critical to its operation.

Sound-sync detector 21, in turn, connects to an audio system 22 having appropriate circuitry for reproducing the audio portion of the received signal. Sound-sync detector 21 further connects to horizontal and vertical scanning generator 23 wherein appropriate scanning signals are developed for application to appropriate deflection yokes 24*a* and 24*b* positioned about the image reproducer 20 to reproduce the televised image in the well-known manner.

As thus far described, the receiver is conventional in general construction and operation such that further and more particular operational description should not be necessary. More particular consideration, however, may now be given to that portion of the receiver which relates to the preferred embodiment of the present invention, and in general constitutes an AFC defeat circuit operative in cooperation with an AFC system 14.

The AFC system 14 shown in FIG. 1 is merely illustrative of one of several AFC systems which may be used with the AFC defeat circuit 15 disclosed herein. In that system, a capacitor 25 couples intermediate-frequency (IF) signals from IF amplifier 13, preferably the last stage thereof, to the input selector circuit of the AFC system 14. The selector circuit comprises a variable inductor 26 and capacitors 27, 28, collectively tuned to the IF frequency. Output IF signals from the selector circuit are, in turn, connected to the base electrode 29*b* of a driver transistor 29 which amplifies them to a suitable level prior to their application to a discriminator network, identified generally at 30. The emitter electrode 29*e* is coupled to ground through a parallel network comprising resistor 31 and capacitor 32 while collector electrode 29*c* is coupled to a source of unidirectional potential (B+) through the tap of variable inductor 33 connected to resistor 34. Operating potential is applied to the base electrode 29*b* from the source of B+ potential through a voltage divider network consisting of the series connected resistors 35, 36 and 37.

The discriminator network 30 is of a form well-known in the art and as previously mentioned connects to the collector electrode 29*c*. In response to the amplified IF signal from driver transistor 29, discriminator network 30 develops a composite control signal at output terminal 38 having a first component representative of the deviation of the actual video IF frequency from its desired value and a second component dependent upon deviation of the actual audio IF frequency from its particular desired value. The composite control signal at terminal 38 is, in turn, coupled to the tunable element of the heterodyne oscillator (not shown) in tuner stage 12. Accordingly, the frequency of the oscillator is controlled to maintain the frequencies of the video and the audio components at their desired respective values thereby eliminating any need for manual fine-tuning of the receiver.

In accordance with the present invention, there is included an AFC defeat circuit 15 which effectively disables the AFC system 14 thereby opening the feedback path from the IF amplifier 13 to the input tuner stage 12. The AFC defeat circuit 15 contemplates the provision of a fine-tuning knob 39 coated with a conductive material 40 which is electrically connected by a "wiper" contact 41 to the base electrode 43*b* of switching transistor 43 through a current limiting resistor 42. The emitter electrode 43*e* of transistor 43 is connected directly to ground while the collector electrode 43*c* is coupled to the source of B+ potential through a load resistor 44 and to ground by a capacitor 45. During normal operation, when the AFC system 14 is operative, the switching transistor 43 is non-conductive and the capacitor 45 is fully charged. When it is desired to manually fine-tune the receiver, however, the user's body serves as antenna, picking up radiation in the form of a 60 Hz sine wave and applying it to the conductive coating 40 by means of the contact between the individual's fingers and the knob 39. This signal is, in turn, "picked off" the conductive coating by wiper 41 and applied to the base electrode 43*b* of switching transistor 43. The resultant 60 Hz sine wave alternately drives the switching transistor 43 between conductive and non-conductive states. When transistor 43 is "OFF", capacitor 45 is charged through the high impedance of load resistor 44. During the positive portion of the sine wave signal when transistor 43 is switched "ON", capacitor 45 discharges through the low impedance path to ground provided by transistor 43. The smaller RC time constant of the discharge path permits capacitor 43 to lose its charge whenever the user's fingers touch the conductive coating 40. The resultant voltage at collector electrode 43*c* is very nearly at ground potential. The collector electrode 43*c* is further coupled to the input base electrode 46*b* of a Darlington network 49 comprising transistors 46 and 47 which together with resistor 48 extends between the source of B+ potential and ground. The output voltage developed at the junction of emitter electrode 47*e* and resistor 48 of the Darlington network 49 is, in turn, applied to the junction of resistors 35 and 36 forming the biasing network of driver transistor 29. Accordingly, when the user manually fine-tunes the receiver, the output voltage applied to the junction of resistors 35 and 36 is at nearly ground potential, biasing transistor 29 to non-conduction and automatically switching the AFC system 14 from its operative state. Thus, the manual switches heretofore required for disabling the AFC system 14 have been eliminated, and an automatic electronic AFC defeat circuit operative only during manual fine-tuning has been shown.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

I claim:

1. In a television receiver having an automatic frequency control (AFC) system and means for defeating said AFC system during receiver fine-tuning adjustments by coupling user-intercepted low frequency radiations in the vicinity of the receiver to a conductive fine-tuning knob, comprising in combination: a capacitor; switching means including a transistor switch having an input coupled to said control knob and an output including said capacitor for establishing a short discharge time for said capacitor during conduction of said transistor switch; coupling means, including an impedance for establishing a long charge time for said capacitor, coupling said capacitor to said AFC system; said transistor switch being driven conductive and non-conductive in accordance with the frequency of said user-intercepted radiation coupled thereto, whereby the difference between said charge time and said discharge time for said capacitor results in a change in voltage across said capacitor for disabling said AFC system.

2. In a television receiver as set forth in claim 1, further including a source of B+ potential and a ground reference; said storage capacitor being connected at one terminal to said source of B+, through said impedance element, and to said ground reference at its other terminal.

3. In a television receiver as set forth in claim 2, wherein said coupling means further include a second transistor switch having an input coupled to said capacitor and an output coupled to said AFC system for supplying operating bias to said AFC system.

* * * * *